April 2, 1940.  S. LESKIEWICZ  2,195,537
APPARATUS FOR FORMING CUTTING DIES
Filed June 22, 1937  2 Sheets-Sheet 1
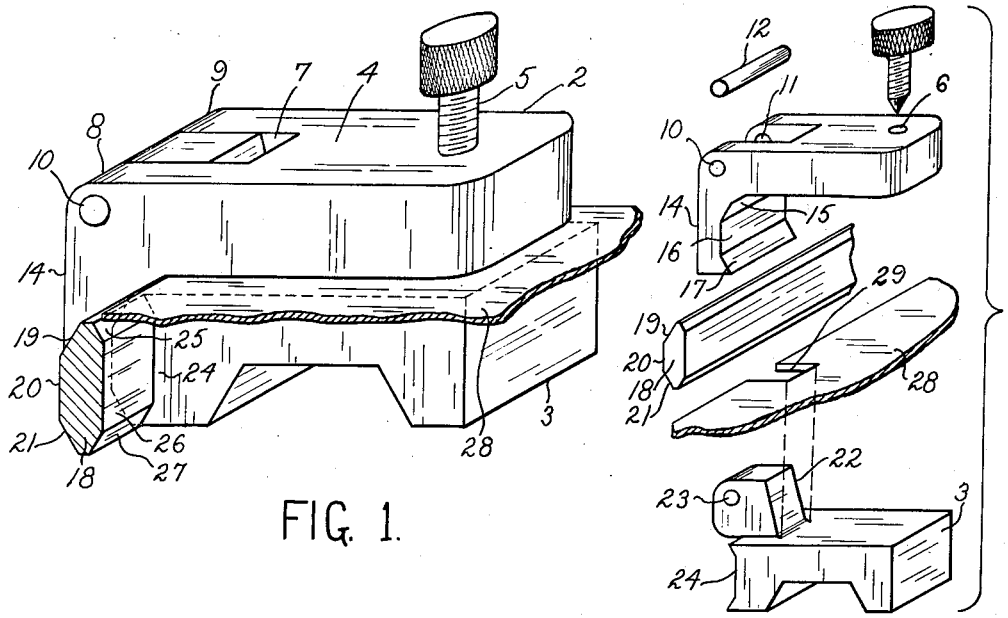
FIG. 1.
FIG. 2.
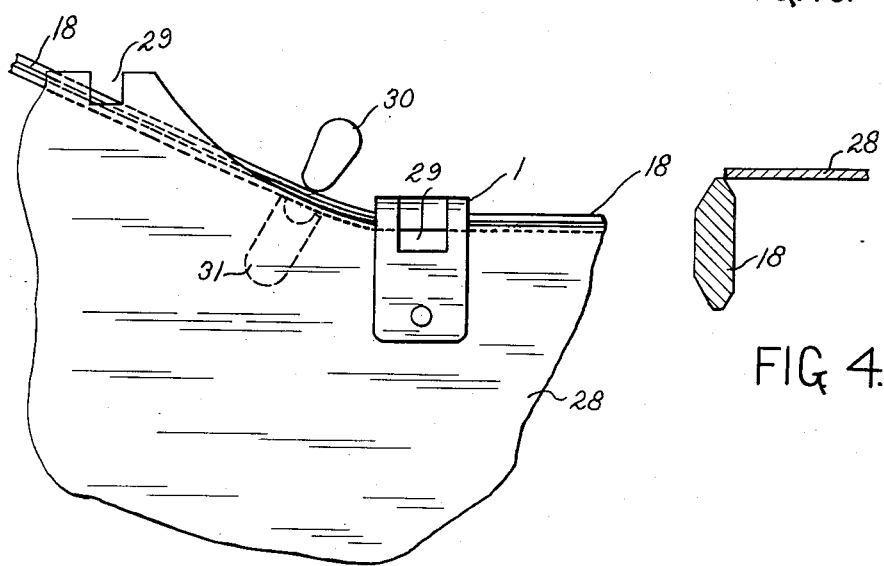
FIG. 3.
FIG. 4.
INVENTOR
Stanley Leskiewicz
BY
ATTORNEY April 2, 1940.　　　　S. LESKIEWICZ　　　　2,195,537
APPARATUS FOR FORMING CUTTING DIES
Filed June 22, 1937　　　　2 Sheets-Sheet 2
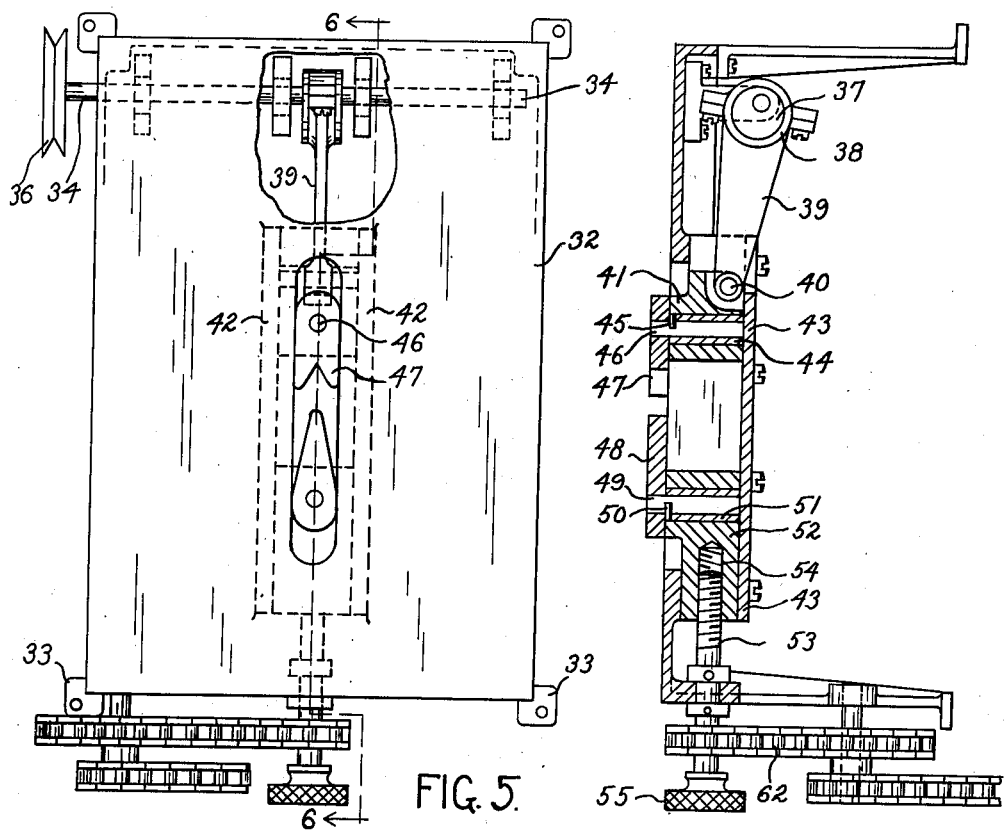
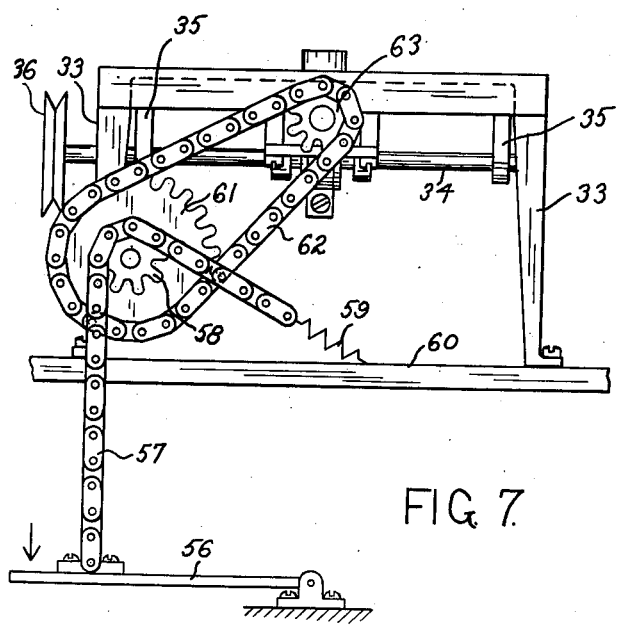
INVENTOR
Stanley Leskiewicz
BY
ATTORNEY Patented Apr. 2, 1940

2,195,537

UNITED STATES PATENT OFFICE 2,195,537

APPARATUS FOR FORMING CUTTING DIES

Stanley Leskiewicz, Lynn, Mass., assignor to North Shore Cutting Die Company, Lynn, Mass., a firm composed of John Hermanson, Joseph Toll, and himself Application June 22, 1937, Serial No. 149,717

4 Claims. (Cl. 153—32)

The present invention relates to an apparatus for forming cutting dies of most every description, and in particular to dies used in cutting cloth, fabric, paper, leather, Cellophane, rubber, and in fact all kinds of yielding materials that must be cut in patterns or exact shapes.

The invention is particularly applicable to the shoe industry where the uppers comprising inner and outer pieces must always be cut to the exact configurations and sizes in order to have them go together in the right manner to form the shoe. These dies are sometimes known in the trade as clicker dies because of the manner in which they are used.

The die of the present invention, when formed has either one or two cutting edges, and is used by laying the die on the material to be cut which may be of a number of thicknesses so that a number of pieces are cut out with one action of the clicker press. The press comes down and strikes the die, forcing it through the material and punching out the pieces from the material beneath it. These dies are in very common use, particularly in the shoe industry and further are frequently changed because each change in design of a shoe necessitates a change in the shape of the die.

In the present invention the die material comes in the form of strip stock which may have bevelled edges or be provided with any other shaped cross section depending on the use to which the die is to be put and other factors, not a part of this invention. The stock, that is the die strip, is attached to the template to which the die stock is to conform, in a manner which will be described later and then the strip is put through the forming press or tool to shape the die in the form desired. The two open ends are then welded together in any suitable manner and the die edge sharpened and treated if that is necessary. In some cases it is desirable to sharpen and treat the edge of the strip before forming, and in fact sometimes the strips come from the mills ready to be formed into dies and need not be ground in any way.

In the present invention, the die strip is clamped in a special clamp with the cutting edge of the die strip in the same plane as the template to which the strip is to be formed, the template also being held in the clamping element as will be explained below. The die strip is then put through the forming operation to shape the strip to the template attached to it without removing the template except as desired to continue the operations under certain conditions.

The method and the means for carrying out the invention will be more fully described in connection with the description given below when taken with the drawings, in which—

Figure 1 shows a perspective view of the clamping element with portions of the die strip and the die template in place.

Figure 2 shows an exploded view of the elements shown in Figure 1.

Figure 3 shows a plan view of the die being formed about the template with the clamping element near the forming tool, Figure 4 shows the relative position of the die strip and the template as the die is being formed.

Figure 5 shows a plan view of the forming tool and its operating mechanism.

Figure 6 shows a sectional view taken on the line 6—6 of Figure 5, and,

Figure 7 shows an end view of the mechanism shown in Figure 5 looking from the bottom of the drawing upwards in Figure 5.

In the drawings the clamp shown assembled in Figure 1 is indicated by 1 in Figure 3. This clamp comprises substantially two elements, a bell crank lever 2 and a pivoted bar or plate 3. The bell crank lever 2 has threaded in its top plate 4, a set or clamping screw 5 threaded into the hole 6 indicated more clearly in Figure 2. The plate 4 has its back portion slotted in the shape of a rectangle 7 forming two side pieces 8 and 9 in which there are provided aligned bearings 10 and 11 in which the shaft 12 is placed. The lower part of the bell crank lever 2 or preferably the arm 14 has its inner surface shaped and bevelled as indicated by the faces 15, 16 and 17 to fit the shape of the die strip 18 in the corresponding faces 19, 20 and 21. Aligned with the bearing holes 10 and 11 and fitting on the shaft 12 is the neck or projecting bracket 22 projecting from the top surface of the bar or plate 3 and providing the hole 23 by which the plate 3 is pivoted. The edge of the plate 3 facing the die strip, as indicated in Figures 1 and 2 by 24, is shaped also to conform to the other surfaces of the die strips, namely 25, 26 and 27 as indicated in Figure 1. When the clamp is to be used, the elements just mentioned are assembled as indicated in Figure 1 with the die strip 18 placed in the position there shown between the inner side of the arm 14 and the edge 24 of the plate 3. The template element 28 is then put in position with the square notched portion 29 passing around the block 22. This not only helps to locate the template in its position, but also holds it firmly to the clamp and to the die strip. When the template is in position the screw 5 may be tightened simultaneously forcing the plate 3 downward and gripping the die strip as well as holding the template rigidly in the clamp. As indicated in Figure 3 a number of notches may be provided in the template 28 so that the clamp may be moved along the die strip and template as the die strip is formed to the template. Figure 3 shows the die strip 18 formed to the template 28 at a portion of the template curve and illustrates also a forming tool that is employed in shaping the die strip 18 to the desired contour. These forming elements 30 and 31 may be of various shapes, but usually as is indicated in Figure 3, there is provided a concave element and a pointed element, the concave element 31 in the present instant being vibrated in a manner about to be described to rapidly advance and withdraw the piece 31. The element 30 may be more or less pointed, dependent upon the type of bend that it is desired to make in the die strips and the thickness of the die strips which may vary considerably from $\frac{1}{16}''$ to $\frac{1}{8}''$ or $\frac{1}{4}''$. A sharp tool for the elements 31 and 30 tend to mark the die strips and this sometimes is objectionable where a smooth die element is required. In the present invention a rather dull tool may be used for the element 30 by repeated and rapid action of the impact element 31, the forming of the die may be made rapidly and accurately even with very thick die strips.

In the mechanism shown in Figures 5, 6 and 7 the operation of the tools 30 and 31 is indicated and outlined. Here a platform or table 32 is provided supported in the usual manner by legs 33 shown in Figure 7. The table 32 carries a shaft 34 supported in suitable bearings 35, 35, and carrying at the side the driving pulley 36. The shaft 34 carries an eccentric 37 mounted in a crank shaft bearing 38 of the crank shaft 39. The crank shaft 39 is pivoted at its other end to a shaft 40 which is mounted in the block 41 as indicated in Figures 5 and 6. The movement of the crank shaft 39 is such as to produce a comparatively small reciprocal motion of the block 41 moving in the guides 42, 42 which is beneath the table top. The block 41 is held up by means of the plate 43 attached at the bottom edges of the guides 42, 42. The block 41 is provided with a bushing 44 at the top of which there is a notched or recessed portion to receive the pin 45 projecting from the shaft 46 of the forming tool 47. It will be seen from Figures 5 and 6 that the forming tool 47 may be removed and another tool substituted in its place. All of the tools used in the present arrangement are provided with the same shaft 46 and also the same pin 45 located in the proper position to engage the groove in the bushing 44. A similar construction is provided for the pointed tool 48. This tool has a shaft 49 with a pin 50 which engages a groove at the top of the bushing 51. The bushing 51 is firmly set in the block 52 which may be advanced or retarded by the screw 53 threading into the block at the end as indicated by 54. The block 52 is guided by suitable guides, the base plate 43 and side plates or guides 42, 42. The screw 53 may be operated through the knurled notch 55 by hand or by foot by means of the pedal 56 shown in Figure 7 which may be pressed to lower the sprocket chain 57 which is tensioned over the sprocket 58 by means of the spring 59 attached to the base or floor 60. The sprocket gear 58 may be geared down by means of the gear 61 as indicated in Figure 7 which drives the endless sprocket chain 62 which chain runs around the sprocket gear 63 keyed to the screw shaft 53. The forward movement therefore of the block 52 may be accurately controlled by the pedal 56.

In the operation of the system the template 28 and the strip 18 are clamped together by means of the clamp 1 with the edge of the template corresponding to the edge of the strip at one chosen point, that is the strip is made tangential to the edge of the template on this point. The strip is then put in the forming tool as indicated in Figure 3 and slowly run between the forming tools bending the strip to the shape of the template at the point where the forming tools are positioned. The time which the forming tool is allowed to remain in one position on the template and strip affects the amount of bend given to the strip so that if a sharper bend is desired at any point in the forming die as indicated by the shape of the template the forming tool is allowed to act longer at this point. With the template and the die strip clamped together the operator will readily see when the die strip has the proper shape and may move the die strip along the forming tool back and forth to curve the die strip here and there as may be necessary to conform to the template that is always positioned particularly to the strip itself.

In accordance with the present invention, the template is provided with a number of notches so that as the die strip is formed to the position of the next notch in the template the clamp may be removed and the die strip and template clamped again at a position to keep the edges accurately together. All that the operator does is to move the strip through the operating teeth or jaws and simultaneously press the pedal 56 or turn the knurled hand 55 to obtain sharper or lighter bends of the die strip. The present arrangement with the use of the foot not only leaves the hands free to control carefully the movement of the die strip but it also provides by its rapid repeated quick acting impacts a means of accurately forming the die to the template, as the impacts themselves come in such rapid succession that all portions of the die strips are acted upon as the strip is passed through between the jaw or impact elements.

Having now described my invention, I claim:

1. A clamp of the type described comprising an angle element having a clamping face at the interior surface of one arm of the angle element, the other arm having a clamping screw threaded therethrough, a second element providing a clamping face positioned to oppose and cooperate with the first mentioned clamping face and an additional clamping face cooperating with said clamping screw, said second element having an outwardly projecting bar projecting from said additional clamping face and located so that it occupies a position between the aforesaid screw and the apex of the angle of said angle element and said angle element having means for pivoting said outwardly projecting bar, said outwardly projecting bar serving as a guide and locating means for a template clamped by the clamping screw to said additional clamping face.

2. A clamp of the type described comprising an angle element having a clamping face at the interior surface of one arm of the angle element, the other arm having a clamping screw threaded therethrough, a second element providing a clamping face positioned to oppose and cooperate with the first mentioned clamping face and an additional clamping face cooperating with said clamping screw, said second element having an outwardly projecting bar projecting from said additional clamping face and located so that it occupies a position between the aforesaid screw and the apex of the angle of said angle element and said angle element having means for pivoting said outwardly projecting bar comprising a slot formed in said angle element to receive said projecting bar and a pivot pin, pivoting said bar to the angle element in said slot, said outwardly projecting bar serving as a guide and locating means for a template, clamped by the clamping screw to said additional clamping face.

3. A clamp of the type described comprising an angle element having a clamping face at the interior surface of one arm of the angle element, the other arm having a clamping screw threaded therethrough, a second element providing a clamping face positioned to oppose and cooperate with the first mentioned clamping face and an additional clamping face cooperating with said clamping screw, said second element having an outwardly projecting bar projecting from said additional clamping face and located so that it occupies a position between the aforesaid screw and the apex of the angle of said angle element and said angle element having means for pivoting said outwardly projecting bar comprising a slot formed in said angle element at its vertex to receive said projecting bar and a pivot pin, pivoting said bar to the angle element in said slot at the vertex of said angle element, said outwardly projecting bar serving as a guide and locating means for a template, clamped by the clamping screw to said additional clamping face.

4. A clamp of the type described comprising an angle element having a clamping face at the interior surface of one arm of the angle element, the other arm having a clamping screw threaded therethrough, a second element providing a clamping face positioned to oppose and cooperate with the first mentioned clamping face and an additional clamping face cooperating with said clamping screw, said second element having an outwardly projecting bar projecting from said additional clamping face and located at the vertex of said angle element, and said angle element having means for pivoting said outwardly projecting bar, said outwardly projecting bar serving as a guide and locating means for a template clamped by the clamping screw to said additional clamping face.

STANLEY LESKIEWICZ.